United States Patent
Sagasaki

(10) Patent No.: US 6,477,441 B1
(45) Date of Patent: Nov. 5, 2002

(54) NUMERICAL CONTROL SYSTEM HAVING A BUILT-IN PERSONAL COMPUTER

(75) Inventor: Masakazu Sagasaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/367,739

(22) PCT Filed: Jan. 12, 1998

(86) PCT No.: PCT/JP98/00068

§ 371 (c)(1),
(2), (4) Date: Feb. 15, 2000

(87) PCT Pub. No.: WO98/37466

PCT Pub. Date: Aug. 27, 1998

(30) Foreign Application Priority Data

Feb. 19, 1997 (JP) .............................................. 9-035335

(51) Int. Cl.[7] ........................... G05B 19/18; G06F 12/16
(52) U.S. Cl. ........................... 700/160; 700/79; 700/292
(58) Field of Search .............................. 700/2, 79, 169, 700/160, 292, 296, 177; 713/310; 714/1

(56) References Cited

U.S. PATENT DOCUMENTS 4,692,872 A * 9/1987 Kiya .......................... 364/474
5,726,895 A * 3/1998 Kumakura et al. ..... 364/474.11
5,850,338 A * 12/1998 Fujishima ................... 364/132

FOREIGN PATENT DOCUMENTS

| JP | 6-348377 | 12/1994 | ............. G06F/1/30 |
| JP | 8-77079 | 3/1996 | ........... G06F/12/16 |
| JP | 8-137765 | 5/1996 | ........... G06F/12/16 |

* cited by examiner

Primary Examiner—Paul P. Gordon
(74) Attorney, Agent, or Firm—Sughrue Mion, PLLC

(57) ABSTRACT

A numerical control system having a built in personal computer (PC), is made up of an interrupt generation circuit in an NC section for generating an interrupt in the NC section when a power off switch is pressed, PC termination acknowledgement means in the NC section for sending a termination request to a PC section, acknowledging a termination notification from the PC section, and requesting a DS output circuit to turn off the power of a power unit, a PC power down handling section in the PC section for forcibly terminating an application program and an operating system in the PC section after receiving the termination request sent from the PC termination acknowledgement means in the NC section, and a BIOS section for checking that the operating system is terminated and sending a termination notification to the NC section. Thus, in the numerical control system having a built-in PC, the power is turned off soundly without destroying an external storage unit such as a hard disk storage unit.

14 Claims, 10 Drawing Sheets

POWER ON TIME START PC APPLICATION PROGRAM CHECK TABLE

MEL SCREEN. EXE
Dload611. EXE

POWER OFF TIME DO OUTPUT SELECTION REGISTRATION SCREEN

| DEVICE | STATE | COMMENT |
|--------|-------|---------|
| Y001 | 1 | X1 BRAKE ON |
| Y002 | 0 | ○○○○○ |
| Y003 | -1 | ○○○○○ |
| Y004 | -1 | ○○○○○ |
| Y005 | -1 | ○○○○○ | ial computer built-in
NUMERICAL CONTROL SYSTEM HAVING A BUILT-IN PERSONAL COMPUTER

TECHNICAL FIELD

This invention relates to a personal computer built-in numerical control system and in particular to breakage of an external storage unit and data destruction prevention when power is turned off.

BACKGROUND OF THE INVENTION

With a personal computer built-in numerical control system, a work program is edited, etc., in a man-machine interface processing section (which will be hereinafter referred to as the MMI processing section) of a personal computer section (which will be hereinafter referred to as the PC section) and the work program registered in memory of a numerical control system section (which will be hereinafter referred to as the NC section) is analyzed and interpolated in the NC section, then a command is output to a servo system of a machine tool in response to the processing result.

FIG. 11 shows an outline of a personal computer built-in numerical control system (which will be hereinafter referred to as the PC built-in numerical control system). The PC built-in numerical control system has an NC section 100 for executing a work program and a PC section 200 for mainly performing screen display processing and setting processing of data, etc., and power is supplied from a power unit 5. The power unit 5 converts AC power supply 200 VAC into DC and supplies 24 VDC to the numerical control system.

The NC section 100 has a work program analysis processing section 10, memory 11, an interpolation processing section 12, axis control sections 13, a machine control signal processing section 30, a ladder circuit section 14, a digital signal input circuit (which will be hereinafter referred to as the DS input circuit) 15, a digital signal output circuit (which will be hereinafter referred to as the DS output circuit) 16, a PC interface section 17, dual port RAM 18, flash memory 19, and backup data write means 20.

Although only one axis control section 13 is shown in FIG. 11, it is provided for each axis and a servo amplifier 310 of a servo motor 300 of each axis is connected to each axis control section 13.

Although not shown in FIG. 11, the servo motor 300 is provided with a pulse generator for position detection and the servo amplifier 310 has a position loop based on a position feedback signal from the pulse generator.

The PC section 200 has a BIOS (Basic I/O System) section 201, an operating system section (which will be hereinafter referred to as the OS section) 202, an MMI processing section 210, and an NC interface section 203. A hard disk storage unit (which will be hereinafter referred to as the external storage unit) 250 and an operation panel 260 with a display are connected each through an interface (not shown).

The MMI processing section 210 has image display processing means 211 and data setting means 212.

The operation panel 260 has a display 261 made of a CRT, an LCD, etc., a data input section 262 as a keyboard, a power on switch 263, and a power off switch 264.

The PC built-in numerical control system in the related art is thus configured. Next, the operation of the PC built-in numerical control system will be discussed.

With the PC built-in numerical control system, the operator enters a work program by operating the operation panel 260 through the keyboard.

The keyed work program is input through the OS section 202 to the MMI processing section 210. The work program input to the MMI processing section 210 is converted by the data setting means 212 into data code that can be recognized by a personal computer and the data code is written onto the hard disk storage unit 250 through the OS section 202 and is transferred to the NC interface section 203 at the same time.

The NC interface section 203 writes the work program transferred from the data setting means 212 into a determined address of the dual port RAM 18 in the NC section 100 and turns on a data write completion flag.

The PC interface section 17 in the NC section 100 monitors the data write completion flag on the dual port RAM 18. Upon detection of the data write completion flag, the PC interface section 17 reads the work program written into the dual port RAM 18 and writes the work program into a file system constructed in the memory 11.

At this time, the PC interface section 20 checks whether or not code not handled in the numerical control system, for example, code of a lowercase alphabetical character, etc., exists.

The work program written into the hard disk storage unit 250 provides backup data if the work program registered in the memory 11 in the NC section 100 is destroyed.

The input work program is displayed on the display 261 as follows:

First, the PC interface section 17 reads the work program registered in the memory 11, writes the work program into a determined address of the dual port RAM 18, and turns on the data write completion flag.

The NC interface section 203 monitors the data write completion flag on the dual port RAM 18. Upon detection of the data write completion flag, the NC interface section 203 reads the work program written into the dual port RAM 18 and transfers the work program to the image display processing means 211.

The image display processing means 211 adds fixed display data of a screen title, etc., and the like to the received work program and outputs the resultant work program through the OS section 202 to the display 261, which then displays the data of the work program, etc.

Next, an execution procedure of the work program will be discussed. The work program analysis processing section 10 reads the work program one block at a time from the memory 11, processes the read work program, and calculates the end point position of each block. The interpolation processing section 12 interpolates the end point position and distributes to the end point position to a move command per unit time of each moving axis.

The move command output by the interpolation processing section 12 is converted into a move command per unit time considering acceleration and deceleration according to an acceleration and deceleration pattern previously specified by the axis control section 13, and the move command is output to the servo amplifier 310 as a servo move command.

Based on the servo move command, the servo amplifier 310 controls drive of the servo motor 300 attached to a machine tool (not shown).

A machine output signal of cutting oil on/off, etc., is sent from the machine control signal processing section 30 via the DS output circuit 16 to a relay circuit of a machine control panel (not shown), operating a cutting oil on/off switch, etc. A signal input from the machine side of a dog switch, etc., is input through the DS input circuit 15 to the machine control signal processing section 30. The signals input to the DS input circuit 15 and output from the DS output circuit 16 are processed by the machine control signal processing section 30 through the ladder circuit section 14 describing machine control, and the processing result, etc., is sent to the interpolation processing section 12.

To turn off the power of the PC built-in numerical control system in the related art as described above, the power off switch is pressed for shutting down the input power supply of 200 VAC of the power unit 5.

When the power is turned off, the backup data write means 20 reads parameters, etc., used for controlling the servo motors, etc., from the memory 11 and writes the parameters, etc., into the flash memory 19.

The PC built-in numerical control system in the related art is thus configured. Thus, when the PC built-in numerical control system is powered off unconditionally by pressing the power off switch 264, if an application program in the PC section 200 is accessing the hard disk storage unit 250, particularly if data is being written onto the hard disk storage unit 250, there is a possibility that the head may come in contact with the disk of the hard disk storage unit 250, causing damage to the disk or that a file registered on the hard disk storage unit 250 may be destroyed.

Although it is considered that the operator is made to surely terminate the application program and the OS in the PC section 200 and turn off the power, the power off operation becomes intricate and in addition, there is also a possibility that the operator may forget to terminate the application program and the OS in the PC section 200.

When the power is abruptly turned off because of a power outage, etc., if an application program in the PC section 200 is accessing the hard disk storage unit 250, particularly if data is being written onto the hard disk storage unit 250, there is a possibility that the hard disk storage unit 250 itself may be destroyed. If the application program in the PC section 200 does not normally terminate by power off handling, the power cannot be turned off.

Normally, the application program in the PC section 200 frequently accesses the hard disk storage unit 250 (reads or writes) during starting (during initialization), thus if the power is turned off at this time, there is a possibility that the hard disk storage unit 250 may be destroyed.

While the application program in the PC section 200 is accessing the hard disk storage unit 250, particularly while data is being written onto the hard disk storage unit 250, if the power of the numerical control system is turned off, there is a possibility that the hard disk storage unit 250 may be destroyed.

Thus, the main circuit breaker, etc., of the machine tool cannot be turned off arbitrarily in the ladder circuit section 14.

In the PC built-in numerical control system in the related art, when the power is turned off, parameters, etc., for controlling the servo motors, etc., are written into the flash memory 19, etc., in the NC section 100 for data backup. However, the flash memory 19 has a limited capacity and data, such as tool offset data used by the user, is not backed up.

It is therefore an object of the invention to provide a personal computer built-in numerical control system improved so as to turn off power soundly without destroying an external storage unit such as a hard disk storage unit and prevent the external storage unit from being destroyed if the power is abruptly shut down because of a power outage, etc.

DISCLOSURE OF THE INVENTION

To the end, according to the invention, there is provided a personal computer built-in numerical control system, wherein a personal computer is built, having a numerical control system section and a personal computer section, the personal computer built-in numerical control system comprising an interrupt generation circuit being placed in the numerical control system section for generating an interrupt in the numerical control system section when a power off switch is pressed, PC termination acknowledgement means being placed in the numerical control system section for sending a termination request to the personal computer section when the interrupt is generated by the interrupt generation circuit, acknowledging a PC termination notification from the personal computer section, and requesting a signal output circuit to turn on a signal assigned to power off of a power unit, a PC power down handling section being placed in the personal computer section for forcibly terminating an application program and an operating system in the personal computer section after sensing the termination request sent from the PC termination acknowledgement means in the NC section, PC power down handling start wait means being placed in the personal computer section for waiting for the power supply voltage holding time or longer still after the power of the power unit is turned off at the beginning of PC power down handling for preventing the system from advancing to the next process, and a BIOS section being placed in the personal computer section for checking that the operating system is terminated and sending a PC termination notification to the numerical control system section, wherein the power unit turns off power as the signal assigned to power off is turned on by the signal output circuit.

Thus, in the personal computer built-in numerical control system according to the invention, when the power off switch is pressed, the interrupt generation circuit generates an interrupt in the numerical control system section, whereby the PC termination acknowledgement means sends a PC termination request to the personal computer section and checks a PC termination notification from the personal computer section. If a PC termination notification comes, the PC termination acknowledgement means makes a request for turning on a signal assigned to power off of the power unit. When the PC power down handling section in the personal computer section receives the PC termination request sent from the PC termination acknowledgement means in the numerical control system section, it issues a request for forcibly terminating the application program and the operating system in the personal computer section. The BIOS section in the personal computer section detects the operating system being terminated in the personal computer section and sends a PC termination notification to the PC termination acknowledgement means in the numerical control system section. The power unit turns off the power as the signal assigned to power off is turned on. The PC power down handling start wait means in the personal computer section waits for the power supply voltage holding time or longer still after the power of the power unit is turned off at the beginning of PC power down handling for preventing the system from advancing to the next process.

The personal computer built-in numerical control system according to the invention described above further includes digital signal output selection means in the numerical control system section being placed in the personal computer section for setting the state of a digital output signal output by a machine control signal processing section in the numerical control system section to a specified state when power off handling is started.

Thus, in the personal computer built-in numerical control system according to the invention, when power off handling is started, the state of a digital output signal output by the machine control signal processing section is set to the specified state by the digital signal output selection means and the machine state when the power is turned off can be set to a predetermined state.

According to the invention, there is provided a personal computer built-in numerical control system, wherein a personal computer is built, having a numerical control system section and a personal computer section, the personal computer built-in numerical control system comprising power off request signal detection means being placed in the numerical control system section for detecting a power off request signal from a ladder circuit section, ladder circuit correspondence PC termination acknowledgement means being placed in the numerical control system section for sending a termination request to the personal computer section when the power off request signal is detected by the power off request signal detection means and acknowledging a termination notification from the personal computer section, power off enable signal output means being placed in the numerical control system section for turning on a power off enable signal for the ladder circuit section when the ladder circuit correspondence PC termination acknowledgement means acknowledges the PC termination notification from the personal computer section, a PC power down handling section being placed in the personal computer section for forcibly terminating an application program and an operating system in the personal computer section after sensing the termination request sent from the ladder circuit correspondence PC termination acknowledgement means in the numerical control system section, PC power down handling start wait means being placed in the personal computer section for waiting for the power supply voltage holding time or longer still after the power of the power unit is turned off at the beginning of PC power down handling for preventing the system from advancing to the next porcess, and and a BIOS section being placed in the personal computer section for checking that the operating system is terminated and sending a PC termination notification to the numerical control system section, wherein the power unit turns off power as a signal assigned to power off in the ladder circuit section is turned on by a signal output circuit as the power off enable signal to the ladder circuit section is turned on by the power off enable signal output means.

Thus, in the personal computer built-in numerical control system according to the invention, the power off request signal detection means in the numerical control system section detects a power off request signal from the ladder circuit, the ladder circuit correspondence PC termination acknowledgement means issues a PC termination request to the personal computer section when the power off request signal is detected by the power off request signal detection means and checks a PC termination notification from the personal computer section. When the ladder circuit correspondence PC termination acknowledgement means acknowledges the PC termination notification from the personal computer section, the power off enable signal output means being placed in the numerical control system section turns on a power off enable signal for the ladder circuit section. The PC power down handling section in the personal computer section receives the PC termination request sent from the ladder circuit correspondence PC termination acknowledgement means in the numerical control system section, it issues a request for forcibly terminating the application program and the operating system in the personal computer section. The BIOS section in the personal computer section detects the operating system being terminated in the personal computer section and issues a PC termination notification to the PC termination acknowledgement means in the numerical control system section. The power unit turns off the power as the signal assigned to power off in the ladder circuit section is turned on by the signal output circuit as the power off enable signal to the ladder circuit section is turned on by the power off enable signal output means. The PC power down handling start wait means in the personal computer section waits for the power supply voltage holding time or longer still after the power of the power unit is turned off at the beginning of PC power down handling for preventing the system from advancing to the next process.

In the personal computer built-in numerical control system according to the invention described above, when a power off switch is pressed, the ladder circuit section determines the state of any other signal input from a machine tool and if power off conditions are not satisfied, starting of power off handling is inhibited and alarm output processing is performed, and if power off conditions are satisfied, a power off request signal of the ladder circuit section is turned on.

Thus, in the personal computer built-in numerical control system according to the invention, when the power off switch is pressed, the ladder circuit section determines the state of any other signal input from the machine tool and if the power off conditions are not satisfied, starting of the power off handling is inhibited and alarm output processing is performed, and if the power off conditions are satisfied, the power off request signal of the ladder circuit section is turned on and the power off handling is started.

The personal computer built-in numerical control system according to the invention described above further includes application program start completion notification means being placed in the personal computer section for sending an application program start completion notification, and PC start completion check means being placed in the numerical control system section for checking the application program start completion notification from the application program start completion notification means, if start completion is indicated, the PC start completion check means for sending a termination processing continuation notification to the PC termination acknowledgement means.

Thus, in the personal computer built-in numerical control system according to the invention, the application program start completion notification means in the personal computer section sends a start completion notification to the numerical control system section upon completion of starting the application program, and the PC start completion check means in the numerical control system section checks the application program start completion notification from the personal computer section. If start completion is indicated, the PC start completion check means sends a termination processing continuation notification to the PC termination acknowledgement means.

The personal computer built-in numerical control system according to the invention described above further includes PC termination timeout retry check means being placed in the numerical control system section for making a retry over or timeout check at least either if PC termination notification from the personal computer section cannot be acknowledged or if application program start completion notification cannot be acknowledged, and sending a termination notification to the PC termination acknowledgement means or the ladder circuit correspondence PC termination acknowledgement means, and disk cache control means being placed in the personal computer section for invalidating a disk cache of an external storage unit in the personal computer section after sensing termination request sent from the PC termination acknowledgement means in the numerical control system section, wherein the power unit outputs a power reset signal for inhibiting a controller of the external storage unit in the personal computer section from newly writing data when the power is turned off, and. wherein the power unit has a power supply voltage holding function of holding power supply voltage for as long as the time to completion of writing if an application program, etc., starts writing onto an external storage unit at the same time as the power of the power unit is turned off.

Thus, in the personal computer built-in numerical control system according to the invention, if a response to a request sent to the personal computer section from the personal computer section cannot be acknowledged or if application program start completion notification cannot be acknowledged, the PC termination timeout retry check means in the numerical control system section makes a retry over or timeout check, and sends a termination notification to the PC termination acknowledgement means. The power unit holds the power supply voltage for as long as the time to completion of writing if the application program, etc., starts writing onto an external storage unit at the same time as the power off handling is started. After the power reset signal is input, data is prevented from being newly written onto the external storage unit.

The personal computer built-in numerical control system according to the invention described above further includes servo amplifier initialization means being placed in the numerical control system section for transmitting an emergency stop signal and a termination command to a servo amplifier when power off handling is started.

Thus, in the personal computer built-in numerical control system according to the invention, when the power off handling is started, the servo amplifier initialization means transmits an emergency stop signal and a termination command to the servo amplifier.

The personal computer built-in numerical control system according to the invention described above further includes data backup means being placed in the numerical control system section for reading a parameter registered in the numerical control system section or data, etc., edited by the user and transferring to the personal computer section as power off handling is performed, and backup data write means being placed in the personal computer section for writing the backup data from the data backup means into a determined location of a hard disk unit.

Thus, in the personal computer built-in numerical control system according to the invention, the data backup means in the numerical control system section reads the parameter registered in the numerical control system section or the data, etc., edited by the user and transfers to the personal computer section as the power off handling is performed. The backup data write means in the personal computer section writes the backup data from the data backup means into the determined location of a hard disk unit.

BEST MODE FOR CARRYING OUR THE INVENTION

Figure 1:
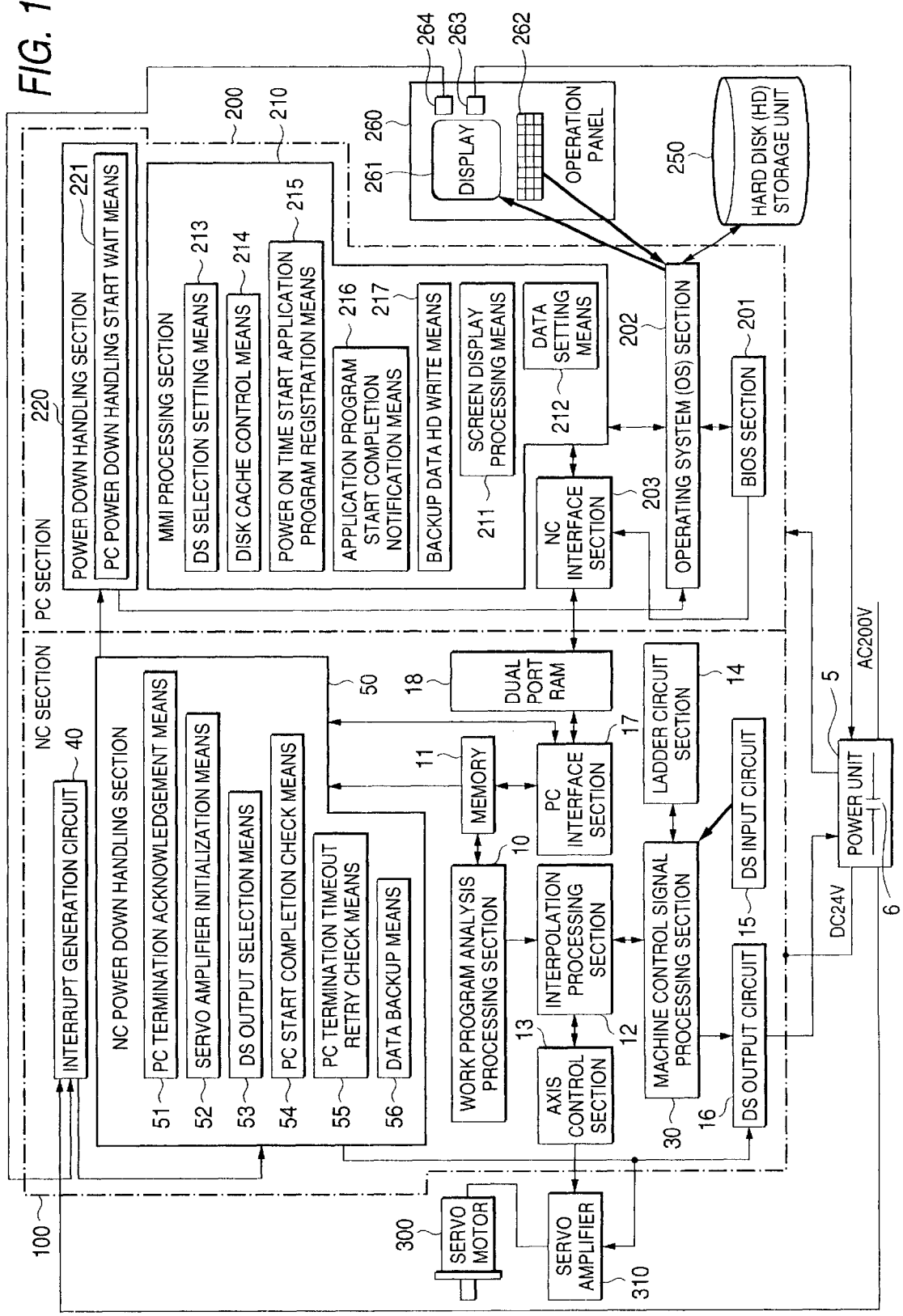
FIG. 1 is a block diagram to show a first embodiment of a personal computer built-in numerical control system according to the invention.

Referring now to the accompanying drawings of FIGS. 1 to 10, embodiments of a personal computer built-in numerical control system according to the invention will be discussed in detail.

Parts identical with those in the related art example described above are denoted by the same reference numerals in the embodiments of the invention described below and will not be discussed.

(First Embodiment)

FIG. 1 shows a first embodiment of a personal computer built-in numerical control system according to the invention.

The personal computer built-in numerical control system comprises an NC section 100 to which an interrupt generation circuit 40 and an NC power down handling section 50 are added.

A power off switch 264 is connected to the interrupt generation circuit 40. In other words, the power off switch 264 is connected to the interrupt generation circuit 40. When the power off switch 264 is pressed, the interrupt generation circuit 40 generates a power off handling interrupt in the NC section 100.

The NC power down handling section 50 has PC termination acknowledgement means 51, servo amplifier initialization means 52, DS output selection means 53, PC start completion check means 54, PC termination timeout retry check means 55, and data backup means 56.

The PC termination acknowledgement means 51 sends a termination request to a PC section 200 as an interrupt is generated by the interrupt generation circuit 40, acknowledges a PC termination notification from the PC section 200, and requests a DS output circuit 16 to turn on a digital signal assigned to power off of a power unit 5.

The servo amplifier initialization means 52 transmits an emergency stop signal and a termination command to a servo amplifier 310 in power down interrupt processing.

The DS output selection means 53 sets the state of a digital output signal specified during termination processing of the PC section 200 to a specified state.

The PC start completion check means 54 checks an application program start completion notification from the PC section 200. If the application program start is complete, the PC start completion check means 54 sends a termination processing continuation notification to the PC termination acknowledgement means 51.

If a response of the PC section 200 to a request sent to the PC section 200 cannot be acknowledged or if application program start completion cannot be acknowledged, the PC termination timeout retry check means 55 makes a retry over or timeout check, and sends a termination notification to the PC termination acknowledgement means 51.

The data backup means 56 reads parameters registered in the NC section 100 or data, etc., edited by the user, etc., and transfers the parameters or data to the PC section 200 as power off handling is performed.

A PC power down handling section 220 and PC power down handling start wait means 221 are added to the PC section 200.

After sensing a termination request from the PC termination acknowledgement means 51 in the NC section 100, the PC power down handling section 220 forcibly terminates an application program and an operating system in the PC section 200.

The PC power down handling start wait means 221 prevents the system from advancing to the next process for as long as the time preset in a parameter, etc., when the power is turned off; the detailed operation of the PC power down handling start wait means 221 will be discussed later.

A BIOS section 201 checks that the operating system terminates, and sends a termination notification to the NC section 100.

In addition to usual screen display processing means 211 and data setting means 212, DS selection setting means 213, disk cache control means 214, power on time start application program (startup program) registration means 215, application program start completion notification means 216, and backup data HD write means 217 are added to an MMI processing section 210 in the PC section 200.

The power on time start application program registration means 215 registers an application program automatically started when the power is turned on.

The application program start completion notification means 216 sends a start completion notification to the NC section 100 upon completion of the application program start.

The backup data HD write means 217 writes backup data from the data backup means 56 into a determined location of a hard disk storage unit 250.

The power unit 5 used with the PC built-in numerical control system contains a circuit for detecting input of the digital signal assigned to power off.

Next, power off handling in the PC built-in numerical control system having the configuration as described above will be discussed with reference to FIGS. 2 to 7.

Figure 2:
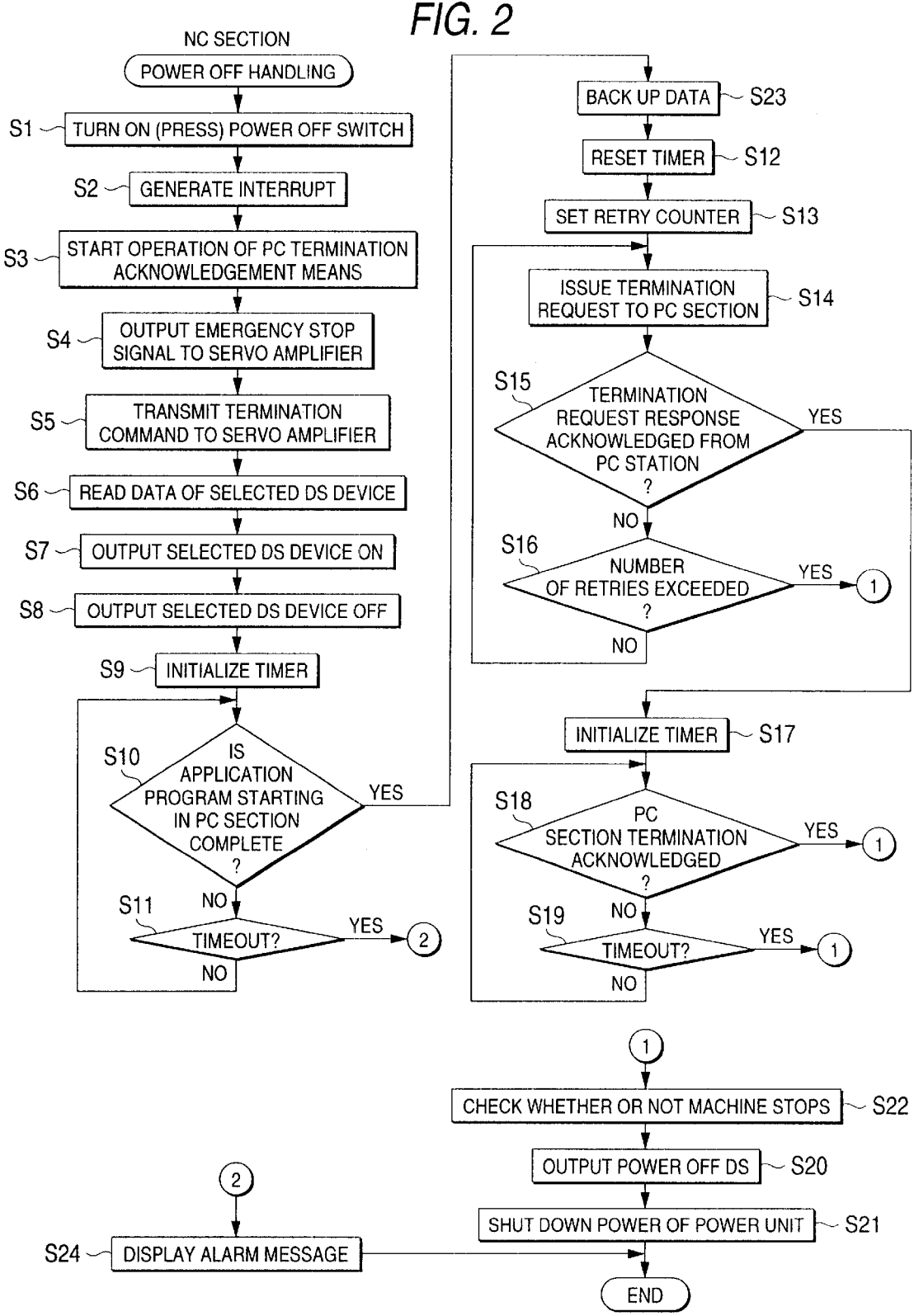
FIG. 2 is a flowchart to show a power off handling procedure of an NC section in the first embodiment of the invention.

FIG. 2 is a flowchart of power off handling executed by the NC section 100.

To turn of the power, if the operator presses the power off switch 264, an input signal to the interrupt generation circuit 40 goes active low, the power off switch 264 being pressed is detected (step S1).

When the input signal to the interrupt generation circuit 40 goes active low, the interrupt generation circuit 40 causes the OS (operating system) in the NC section 100 to generate an interrupt (step S2).

The OS in the NC section 100 determines the type of interrupt and causes the NC power down handling section 50 to start a power down handling routine, whereby the PC termination acknowledgement means 51 starts the operation of PC termination acknowledgement (step S3).

The correspondence between the interrupt type and processing to be started is previously defined in a table in the OS in the NC section 100. The NC power down handling section 50 is assigned a higher priority than a work program analysis processing section 10, an interpolation processing section 12, an axis control section 13, a machine control signal processing section 30, a ladder circuit section 14, and a PC interface section 17. Thus, while the NC power down handling section 50 executes power down handling, the work program analysis processing section 10, the interpolation processing section 12, the axis control section 13, the machine control signal processing section 30, the ladder circuit section 14, and the PC interface section 17 do not execute processing.

Next, the servo amplifier initialization means 52 outputs an emergency stop signal to the servo amplifier 310 (step S4).

When the servo amplifier 310 detects the emergency stop signal, if servo motor 300 is turning, immediately the servo amplifier 310 decelerates and stops the servo motor 300. After the servo motor 300 is decelerated and stopped, the servo amplifier 310 shuts down power supply of a power circuit, whereby the operation of the corresponding machine tool is stopped.

Next, the servo amplifier initialization means 52 transmits a termination command to the servo amplifier 310 (step S5).

Upon reception of the termination command, the servo amplifier 310 terminates the current servo loop processing being executed and waits for an initialization command from the NC section 100 for the next power on of the numerical control system.

By performing the above-described processing, the power of the power circuit of the servo amplifier 310 is shut down as hardware by the emergency stop signal and the servo loop of the servo amplifier 310 is stopped as software by the termination command, thus the servo motor 300 is prevented from operating in error during the power off handling.

Figures 3, 4:
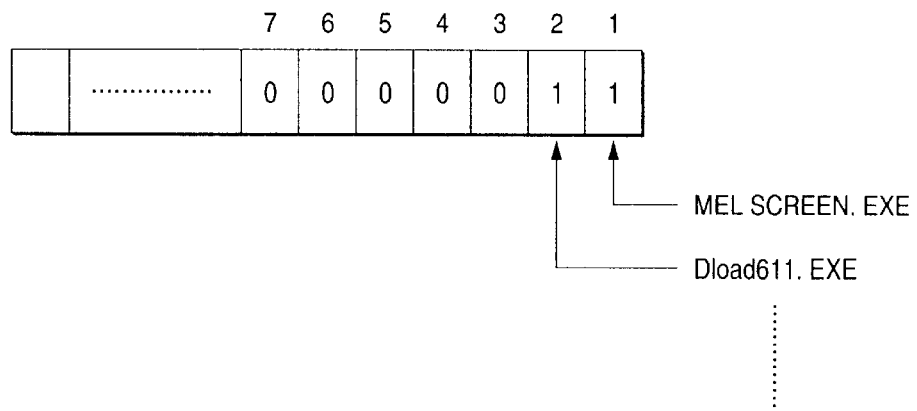
FIG. 3 is a schematic representation to show a power on time start PC application check table.
FIG. 4 is a schematic representation to show a power off time DS output selection registration screen.

Next, upon reception of a processing completion notification from the servo amplifier initialization means 52, the DS output selection means 53 reads data of a DS device previously registered in memory 11 on a setting screen, etc., as shown in FIG. 4 (step S6). The data registered in the memory 11 is classified into digital signals of output on state and digital signals of output off state.

Next, based on the read data, the DS output selection means 53 requests the DS output circuit 16 to turn on output (step S7). The DS output circuit 16 turns on signal output for the digital signal specified from the DS output selection means 53.

Based on the read data, the DS output selection means 53 requests the DS output circuit 16 to turn off output (step S8). The DS output circuit 16 turns off signal output for the digital signal specified from the DS output selection means 53.

If the servo motor 300 drives a head or a work table moving up and down, when the power of the power circuit of the servo amplifier 310 is shut down by the emergency stop, etc., the servo lock state (in which to prevent the table from dropping by gravitation, an electric current is made to flow into the power circuit even in the stop state for producing a torque) is released and the head or the work table drops.

To prevent this phenomenon, an electromagnetic brake is attached to the servo motor 300 and the ladder circuit section 14 makes a determination for outputting an electromagnetic brake on signal through the DS output circuit 16, whereby the electromagnetic brake may be operated, thereby preventing the head or the work table from dropping.

In the PC built-in numerical control system according to the invention, the DS output selection means 53 outputs the digital signal on through the DS output circuit 16 at the same time as the servo amplifier initialization means 52 outputs the emergency stop signal to the servo amplifier 310, thereby turning on the electromagnetic brake, thus the head or the work table moving up and down can be prevented from dropping.

Next, upon reception of a processing completion notification of the DS output selection means 53, the PC termination timeout retry check means 55 initializes a timer (step S9).

The timer is counted by a timer interrupt. The timer interrupt is interrupt service executed at regular intervals; when the power is turned on, the interrupt is started in initialization processing of the OS in the NC section 100. Whenever the timer interrupt is started at regular intervals, a timeout table is decremented. The PC termination timeout retry check means 55 sets a timeout value in the timeout table and turns on a timeout check valid flag, thereby initializing the timer.

Next, the PC start completion check means 54 checks a PC application program start completion flag set in dual port RAM 18 (step S10).

This flag is checked as follows:

An application program started when the power is turned on is previously registered in a power on time start PC application program check table placed in the memory 11 starting at bit 0 as shown in FIG. 3 on a setting screen, etc.

To register the application program in the table, the power on time start application program registration means 215 in the PC section 200 converts the data set on the setting screen, etc., into bit data as shown in FIG. 3 and writes the bit data into the power on time start PC application program check table in the memory 11 through an NC interface section 203, the dual port RAM 18, and the PC interface section 17.

A start completion PC application program check table having similar contents is also defined in the dual port RAM 18 and each application program in the PC section 200 started when the power is turned on turns on a start completion flag on a predetermined bit.

The start completion flag is turned on by the application program start completion notification means 216. The application program start completion notification means 216 is previously added to the application program started when the power is turned on.

The PC start completion check means 54 compares the power on time start PC application program check table in the memory 11 with the start completion PC application program check table in the dual port RAM 18. If they do not match (NO at step S10), the PC start completion check means 54 judges that some application program in the PC section 200 is being started, and sends a timeout check notification to the PC termination timeout retry check means 55.

Thus, the PC termination timeout retry check means 55 receives the notification from the PC start completion check means 54 and checks the timeout table (step S11).

As a result of the checking, if the timeout check valid flag is on and the timeout table is greater than 0, namely, if the timeout is not reached (NO at step S11), the PC termination timeout retry check means 55 sends a notification to the PC start completion check means 54 for instructing the PC start completion check means 54 to again execute step S10. If the timeout check valid flag is on and the timeout table becomes equal to or less than 0 (YES at step S11), the PC termination timeout retry check means 55 judges that timeout occurs, and goes to step S24 for displaying an alarm message.

If the power on time start PC application program check table in the memory 11 matches the start completion PC application program check table in the dual port RAM 18 (YES at step S10), the PC start completion check means 54 judges that starting of all application programs in the PC section 200 that must be started when the power is turned on is complete, and sends an application program start completion notification to the data backup means 56.

Next, the data backup means 56 reads parameters, etc., for controlling the servo motors, etc., registered in the memory 11 and data of tool offset, etc., used by the user, sets the parameters, etc., and the data in the dual port RAM 18 through the PC interface section 17, and sets a backup data set completion flag placed in the dual port RAM 18. The backup data HD write means 217 in the PC section 200 monitors the backup data set completion flag through the NC interface section 203. If the flag is turned on, the backup data HD write means 217 reads backup data set in the dual port RAM 18 and writes the read backup data into a predetermined directory (folder) on the hard disk storage unit 250 (step 23). Upon completion of writing the backup data onto the hard disk storage unit 250, the backup data HD write means 217 resets the backup data set completion flag. The data backup means 56 detects the flag being reset and sends a completion notification to the PC termination timeout retry check means 55.

Thus, the PC termination timeout retry check means 55 turns off the timeout check valid flag and resets the timer (step S12), then sets a value in a retry counter (step S13). The counter value is preset in a parameter on a screen, etc., and is registered in the memory 11.

Next, the PC termination acknowledgement means 51 issues a PC termination request to the PC section 200 (step S14). The PC section 200 has an interrupt circuit (not shown) equivalent to the interrupt generation circuit 40 in the NC section 100, and the PC termination request is issued to the interrupt circuit.

Figure 5:
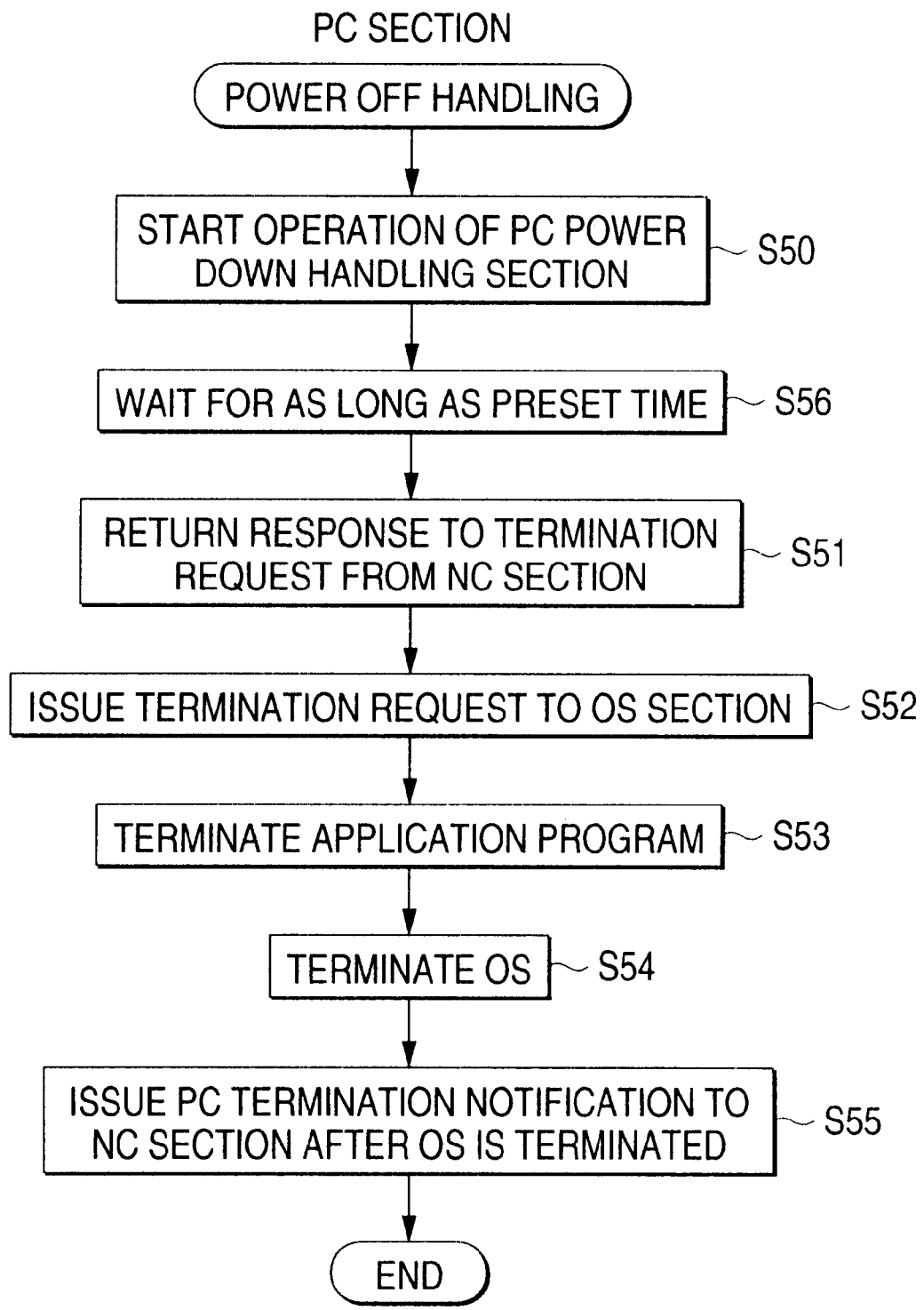
FIG. 5 is a flowchart to show a power off handling procedure of a PC section in the first embodiment of the invention.
Figure 6:
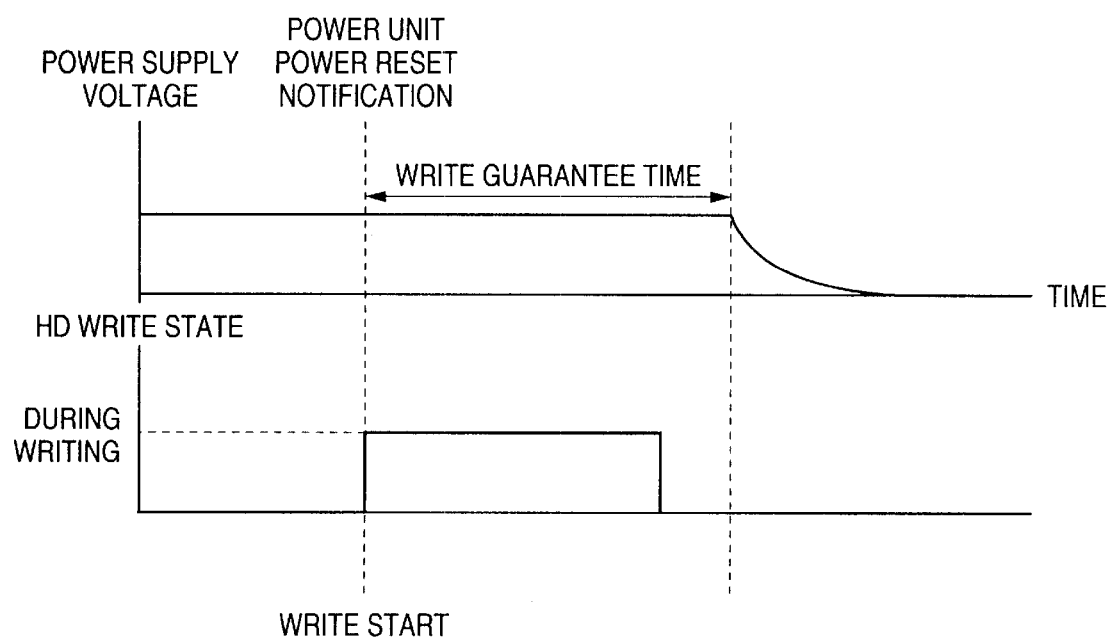
FIG. 6 is a timing chart to show timing of holding power supply voltage when input power of a power unit is shut down and timing applied when write onto a hard disk storage unit occurs when the power of the power unit is shut down.

Referring also to FIG. 5, a power off handling flow in the PC section 200 is also covered in the description to follow.

As the PC termination request is received at the interrupt circuit, the PC section 200 starts the PC power down handling section 220 (step S50).

Next, the PC power down handling start wait means 221 operates and prevents the system from advancing to the next process for as long as the time preset in a parameter, etc., (step S56). Specifically, simple loop processing is executed for as long as the preset time in the PC power down handling start wait means 221. Since processing of the PC power down handling start wait means 221 is executed in the interrupt service, any other application program in the PC section 200 cannot be executed. Therefore, while the PC power down handling start wait means 221 operates, processing of accessing the hard disk storage unit 250 is eliminated. Since the power unit 5 holds power supply voltage as described later after an off signal is entered, if the loop time is set to the time longer than the hold time, the PC power down handling is terminated during execution of the loop processing in the interrupt. That is, even if the power is abruptly turned off because of a power outage, etc., the process advances from the NC power down handling section 50 to the PC power down handling section 220 and during forcible termination of the application and the OS described later, namely, when the hard disk storage unit 250 is frequently accessed, etc., the power is not turned off.

When the PC power down handling section 220 is started, it turns on a PC termination request response flag in the dual port RAM 18 (step S51).

The PC termination acknowledgement means 51 in the NC section 100 checks the PC termination request response flag in the dual port RAM 18. If the PC termination request response flag is off (NO at step S15), the PC termination acknowledgement means 51 sends a retry check notification to the PC termination timeout retry check means 55.

Thus, the PC termination timeout retry check means 55 checks the retry counter. If the retry counter is greater than 0 (NO at step S16), the PC termination timeout retry check means 55 instructs the PC termination acknowledgement means 51 to again execute step S14, and decrements the retry counter.

In contrast, if the retry counter becomes 0 (YES at step S16), the PC termination timeout retry check means 55 judges retry over and instructs the PC termination acknowledgement means 51 to go to step S22.

If the PC termination request response flag is turned on (YES at step S15), the PC termination timeout retry check means 55 initializes the timer (step S17).

In the PC section 200, after the PC termination request response flag is turned on, the PC power down handling section 220 issues a forcible termination request to the OS section 202 (step S52).

For example, if the OS is WINDOW 95 (registered trademark of Microsoft Corporation), a forcible termination function is provided and thus is called.

As the forcible termination request is issued to the OS section 202, the OS section 202 forcibly terminates the current application program being started according to a procedure proper to the operating system (step S53). After acknowledging the termination of the application program, the OS section 202 terminates the operating system (OS) itself (step S54).

When the operating system is terminated and the PC section 200 enters a state in which the power may be turned off, the PC section 200 issues a PC termination notification to the NC section 100 (step S55).

This PC termination notification is issued as follows: Just before the OS section 202 is terminated, it notifies the BIOS section 201 that the operating system termination processing is complete. Upon reception of the termination processing completion notification from the OS section 202, the BIOS section 201 turns on a PC termination completion flag in the dual port RAM 18. WINDOW 95 provides a function called "Advanced Power Management (hereinafter abbreviated as APM) Function" and when WINDOW 95 is terminated, "AMP Function" is called.

When "AMP Function" is called, a function corresponding to the AMP Function provided for the BIOS section 201 is called. A process of turning on the PC termination completion flag in the dual port RAM 18 is entered in the function corresponding to the AMP Function provided for the BIOS section 201, whereby the PC termination completion flag in the dual port RAM 18 can be turned on when WINDOW 95 is terminated.

Here, a return is made to the description of the power off handling in the NC section 100. The PC termination acknowledgement means 51 in the NC section 100 checks the PC termination completion flag in the dual port RAM 18.

If the PC termination completion flag is turned on (YES at step S18), control goes to step S22. In contrast, if the PC termination completion flag is off (NO at step S18), the PC termination acknowledgement means 51 issues a timeout check request to the PC termination timeout retry check means 55, and timeout is monitored in the same manner as at step S11 (step S19).

If the timeout is not reached (NO at step S19), the PC termination acknowledgement means 51 is instructed to again execute step S18. In contrast, if the timeout is reached (YES at step S19), control goes to step S22. At step S22, whether or not the machine stops, namely, whether or not a spindle motor, etc., stops is checked. As a simple check method, whether or not an emergency stop status signal is turned on is checked. Alternatively, whether or not the number of revolutions of the spindle motor reaches 0 is checked.

At step S20, the PC termination acknowledgement means 51 requests the DS output circuit 16 to turn on the digital signal assigned to power off of the power unit 5. The DS output circuit 16 outputs on the digital signal requested to be turned on by the PC termination acknowledgement means 51.

As the digital signal assigned to power off of the power unit 5 is turned on, the power unit 5 shuts down (turns off) the input power supply and feeds a power reset signal into the PC section 200 and the PC termination acknowledgement means 51 executes simple loop processing. Finally, the output voltage of the power unit 5 reaches 0 in a given time, thus the PC termination acknowledgement means 51 terminates the processing while executing the loop processing (step S21).

The power reset signal is connected to an HD controller of the hard disk storage unit 250. Even if the power off handling terminates at the timeout or exceeding the number of retries described above and the application program does not terminate and continues to execute processing, when the power reset signal is input to the HD controller, the hard disk storage unit 250 does not write new data.

However, there is a possibility that data in disk cache of the HD controller may be written continuously onto the hard disk storage unit 250 still after the power reset signal is accepted. If voltage drops while the data is being written, the head of the hard disk storage unit 250 comes in contact with the disk storage medium, destroying the hardware of the hard disk storage unit 250. To avoid this situation, it is necessary to previously invalidate the disk cache. To do this, setting of the disk cache of the HD controller can be validated by the disk cache control means 214 in the PC section 200.

Normally, if the disk cache is invalidated, the apparent operation speed of the application program may be decreased; in the numerical control system, most application programs usually used in the PC section 200 concern screen display of a parameter setting screen, etc. For the screen display, the data read from and written onto the hard disk storage unit 250 often varies in screen units, thus if the disk cache is validated, the disk cache hit probability is low. Therefore, if the disk cache is invalidated, the apparent operation speed of the application program is scarcely decreased.

If the disk cache is invalidated, new data is not written onto the hard disk storage unit 250 after the power reset signal is input from the power unit 5.

However, if the application program or the OS section 202 executes processing, because of the timing at which the application program starts writing onto the hard disk storage unit 250 at the same time, it is necessary to hold the power supply voltage longer than the time to completion of writing onto the hard disk storage unit 250 by the application program. That is, the power supply voltage needs to be held for as long as the write guarantee time.

To hold the power supply voltage for as long as the write guarantee time, a capacitor 6 is built in the power unit 5. The power supply voltage holding time is determined by the capacity of the capacitor 6.

Figure 7:
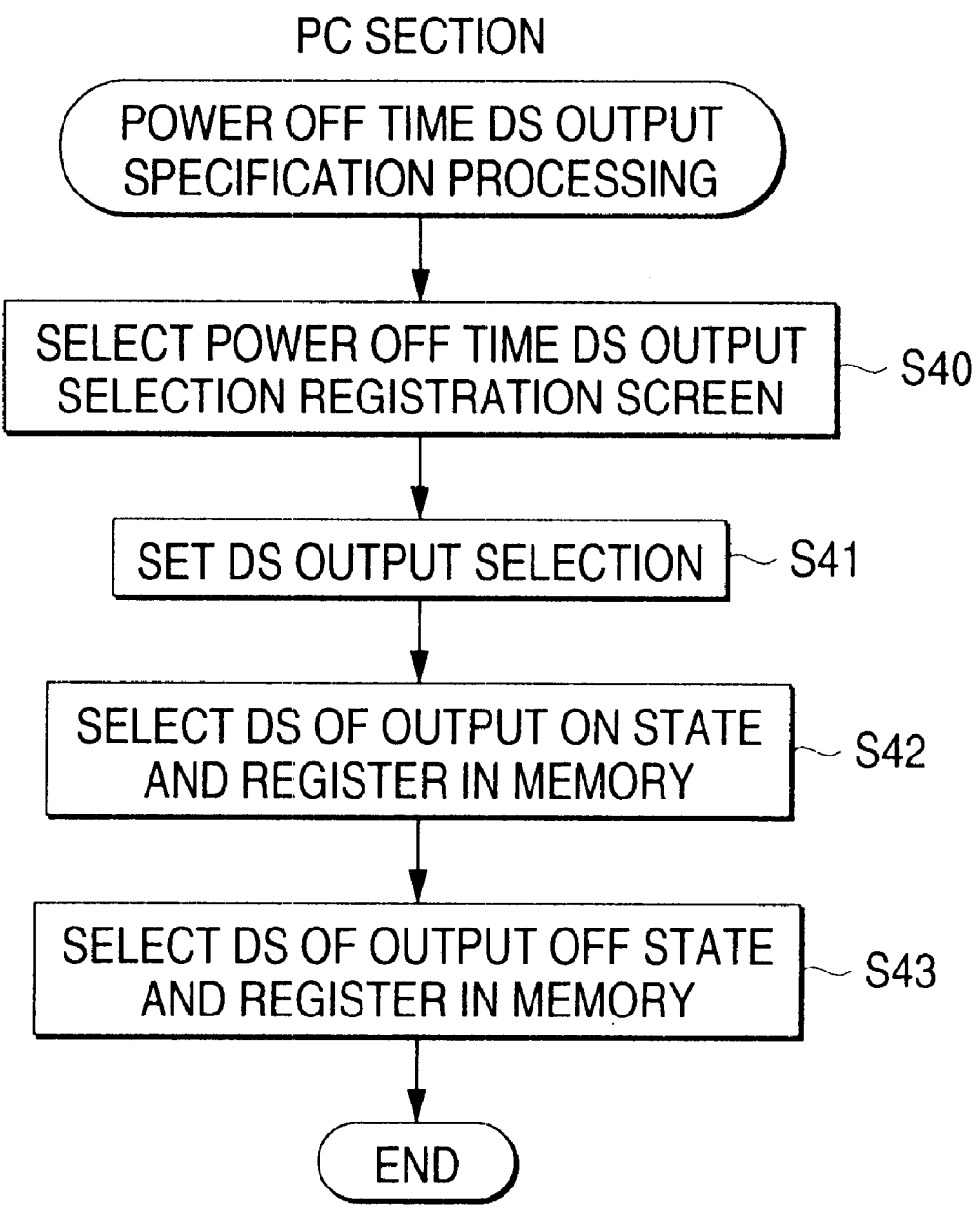
FIG. 7 is a flowchart to show a processing procedure of registering power off time DS output state in the first embodiment of the invention.

Next, a DS output specification method when the power is turned off will be discussed using a power off time DS output selection registration screen example shown in FIG. 4 and a flowchart of FIG. 7.

First, a power off time DS output selection registration screen as shown in FIG. 4 provided as an application program in the PC section 200 is selected (step S40). FIG. 4 shows set items of "Y001", "Y002," . . . as output devices. Each output device set item includes a field for setting a state applied when the power is turned off and a comment field for describing the use purpose, etc., of the corresponding output device.

Next, 1, 0, or −1 is set in the field for setting the output device state applied when the power is turned off (step S41). The value 1 means that the signal of the output device is turned on when the power is turned off, the value 0 means that the signal of the output device is turned off when the power is turned off, and the value −1 means that the signal of the output device is held in the current state.

The setup data is compiled to information of the output devices whose signal is turned on when the power is turned off by the DS selection setting means 213 and the information is registered in the memory 11 through the NC interface section 203, the dual port RAM 18, and the PC interface section 17 (step S42)

The DS selection setting means 213 compiles information of the output devices whose signal is turned off when the power is turned off and registers the information in the memory 11 through the NC interface section 203, the dual port RAM 18, and the PC interface section 17 (step S43).

As described above, in the embodiment, when the power is turned off, the application program and the operating system in the PC section 200 are terminated before the power is actually turned off. Thus, this prevents the application program or the operating system in the PC section 200 from reading or writing data from or onto the hard disk storage unit 250 at the instant at which the power is turned off; the hard disk is prevented from being destroyed or a file registered on the hard disk is prevented from being destroyed.

In the power off handling, if a response of the PC section 200 to the power off request issued from the NC section 100 to the PC section 200 cannot be acknowledged, or if the application program start completion cannot be acknowledged, retry over or timeout handling is performed and the power off handling is continued. Thus, if an abnormal condition occurs in the PC section 200 and data write onto the hard disk storage unit 250 occurs at the same time as the power is turned off, the power unit 5 holds the power supply voltage for as long as the time to completion of the write. Thus, if an abnormal condition occurs in the PC section 200, the hard disk storage unit 250 is not destroyed and the power can always be turned off reliably.

Since a wait is made for power off handling to completion of starting an application program in the PC section 200, when the power is turned off, the application program in the PC section 200 is prevented from reading or writing data from or onto the hard disk storage unit 250; the hard disk storage unit 250 is prevented from being destroyed or a file registered on the hard disk is prevented from being destroyed, and the power can be turned off soundly.

(Second Embodiment)

Figure 8:
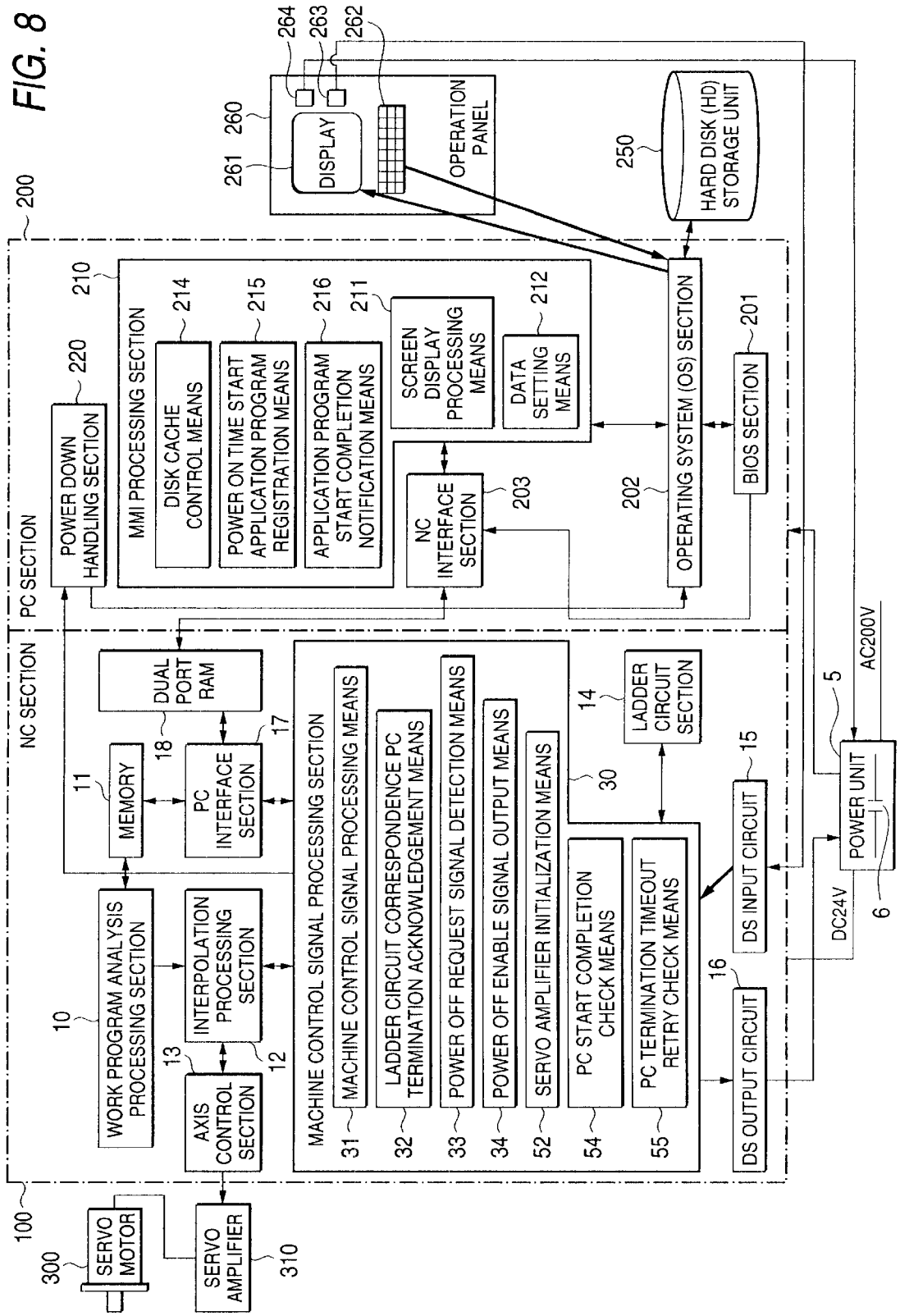
FIG. 8 is a block diagram to show a second embodiment of personal computer built-in numerical control system according to the invention.

FIG. 8 shows a second embodiment of personal computer built-in numerical control system according to the invention. Parts identical with or similar to those previously described with reference to FIG. 1 are denoted by the same reference numerals in FIG. 8 and will not be discussed again.

In the second embodiment, a machine control signal processing section 30 in an NC section 100 is provided with ladder circuit correspondence PC termination acknowledgment means 32, power off request signal detection means 33, power off enable signal output means 34, servo amplifier initialization means 52, PC start completion check means 54, and PC termination timeout retry check means 55 in addition to usual machine control signal processing means 31.

As the power off request signal detection means 33 detects a power off request signal issued from a ladder circuit section 14, the ladder circuit correspondence PC termination acknowledgment means 32 sends a termination request to a PC power down handling section 220 in a PC section 200 and acknowledges a termination notification from the PC section 200.

The power off enable signal output means 34 outputs a power off enable signal to the ladder circuit section 14 after sensing the termination request from the ladder circuit correspondence PC termination acknowledgment means 32.

The servo amplifier initialization means 52, the PC start completion check means 54, and the PC termination timeout retry check means 55 may be substantially the same as those in the first embodiment.

A power off switch 264 is connected to a DS input circuit 15 in the NC section 100. When the power off switch 264 is pressed, a power off input signal to the DS input circuit 15 makes a transition to an on state. The machine control signal processing means 31 detects the signal input to the DS input circuit 15, then converts the signal into a signal corresponding to the ladder circuit section 14 and notifies the ladder circuit section 14 that the power off input signal is input.

Figure 9:
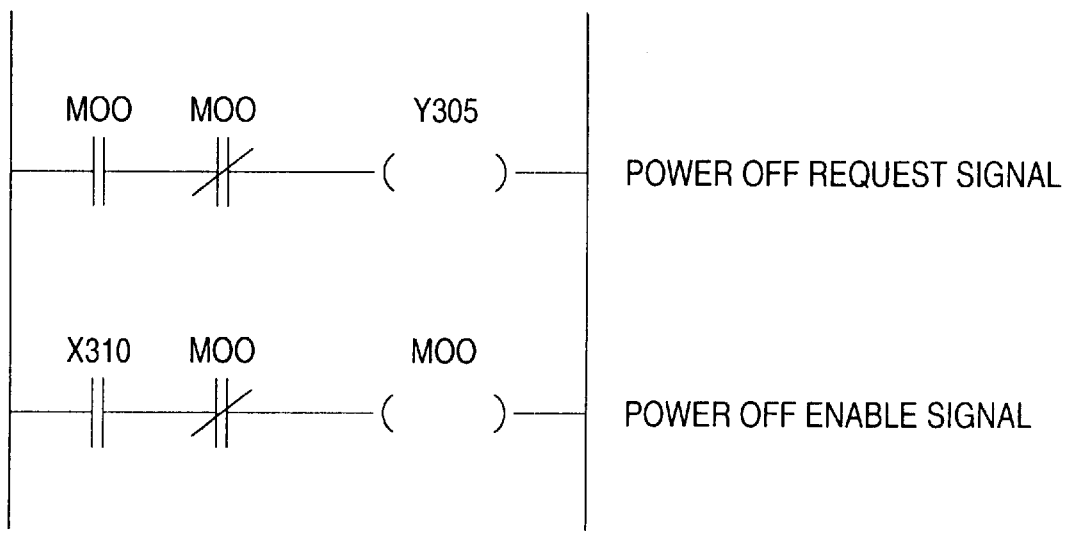
FIG. 9 is a ladder circuit diagram to describe input/output signals in the second embodiment of the invention.

As shown in FIG. 9, the ladder circuits of the ladder circuit section 14 include device "Y305" defining a power off request signal and device "X310" defining a power off enable signal. As the ladder circuit 14 turns on the device "Y305," the power off request signal detection means 33 detects the power off request signal from the ladder circuit section 14.

Upon reception of a notification from the ladder circuit correspondence PC termination acknowledgment means 32, the device "X310" is turned on and the power off enable signal output means 34 turns on.

A power unit 5, like that in the first embodiment, contains a circuit for detecting input of a digital signal assigned to power off and a capacitor 6 to hold the power supply voltage for as long as the write guarantee time is built in the power unit 5.

The PC section 200 has a configuration similar to that in the first embodiment; the PC power down handling section 220 is given a termination request from the ladder circuit correspondence PC termination acknowledgment means 32 in the machine control signal processing section 30, then forcibly terminates each application program and the operating system in the PC section 200.

Figure 10:
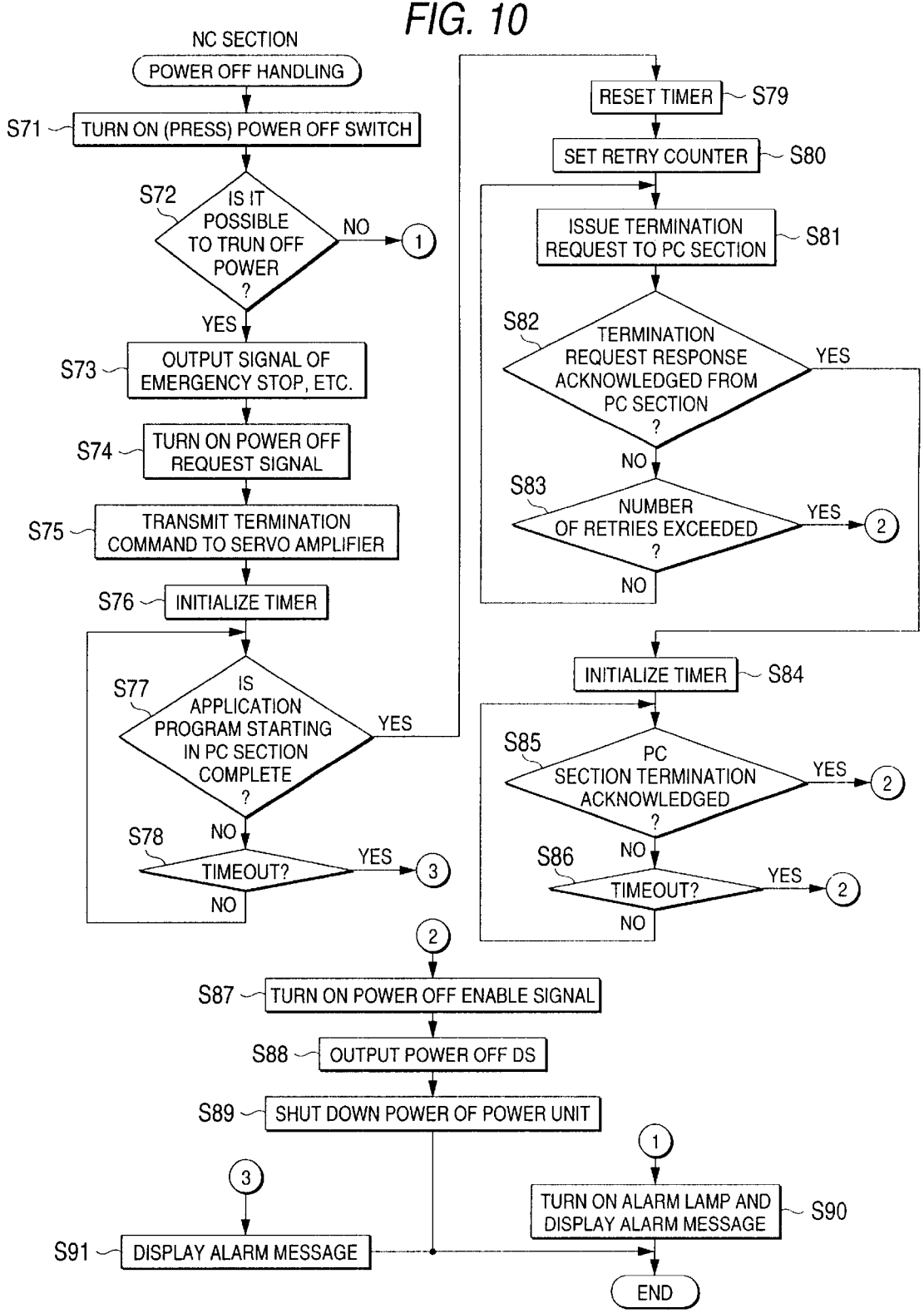
FIG. 10 is a flowchart to show a power off handling procedure of an NC section in the second embodiment of the invention.
Figure 11:
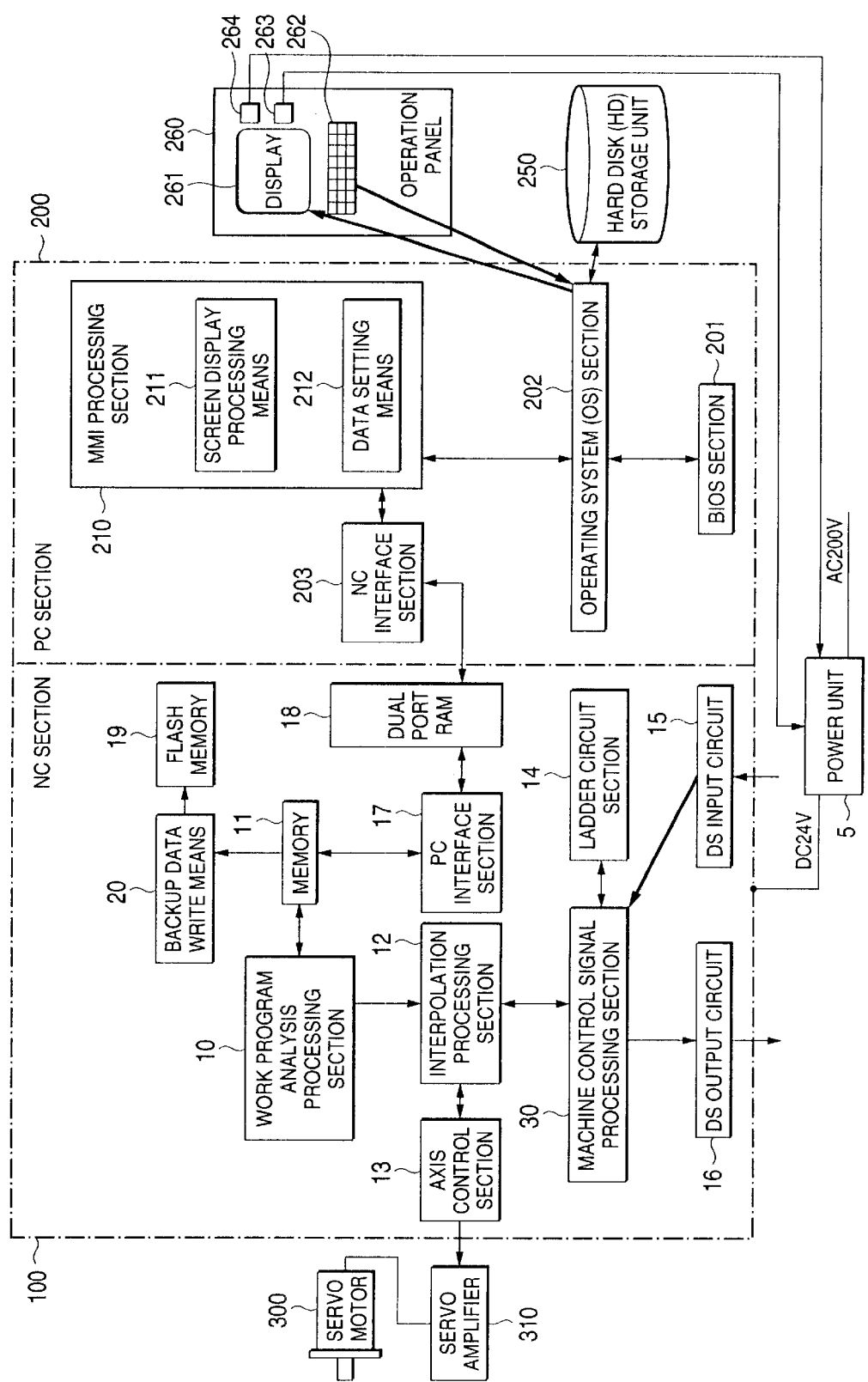
FIG. 11 is a block diagram of a personal computer built-in numerical control system in a related art.

Next, power off handling in the PC built-in numerical control system having the configuration as described above will be discussed with reference to a ladder circuit diagram of FIG. 9 and a flowchart of FIG. 10.

To turn of the power, if the operator presses the power off switch 264, a power off input signal to the DS input circuit 15 makes a transition to an on state (step S71). The machine control signal processing means 31 detects the signal input to the DS input circuit 15, then converts the input signal into a signal corresponding to the ladder circuit section 14 and notifies the ladder circuit section 14 that the power off input signal is input.

When the ladder circuit section 14 receives the notification indicating that the power off input signal goes on, it determines the state of any other signal input from the machine tool and checks whether or not the power may be turned off (step S72). If the power off conditions are not satisfied (NO at step S72), the ladder circuit section 14 goes to step S90.

At step S90, the ladder circuit section 14 requests the machine control signal processing section 30 to turn on an alarm lamp and at the same time, makes a request for displaying an alarm message and cause.

Upon detection of the request for turning on the alarm lamp from the ladder circuit section 14, the machine control signal processing means 31 in the machine control signal processing section 30 turns on the relay connected to the alarm lamp through a DS output circuit 16 for turning on the alarm lamp. Responding to the message display request, the machine control signal processing means 31 displays an alarm message and cause on a display 261 through a PC interface section 17, dual port RAM 18, an NC interface section 203, and screen display processing means 211.

If the power off conditions are satisfied (YES at step S72), the ladder circuit section 14 turns on an emergency stop request signal for the machine control signal processing section 30. When the machine control signal processing means 31 in the machine control signal processing section 30 detects the emergency stop request signal, it outputs an emergency stop signal to a servo amplifier 310 (step S73). The operation of the servo amplifier 310 responsive to the emergency stop signal is the same as the operation previously described at step S4 in the first embodiment.

Next, the ladder circuit section 14 turns on a power off request signal for the machine control signal processing section 30 (step S74). Specifically, in the ladder circuit diagram of FIG. 9, the device "Y305" defining the power off request signal is turned on.

When the power off request signal detection means 33 in the machine control signal processing section 30 detects the power off request signal from the ladder circuit section 14, it notifies the servo amplifier initialization means 52 and the ladder circuit correspondence PC termination acknowledgment means 32 that the power off request signal has been detected.

Upon reception of the notification indicating detection of the power off request signal, the servo amplifier initialization means 52 transmits a termination command to the servo amplifier 310 through an interpolation processing section 12 and an axis control section 13 (step S75).

Upon reception of the termination command, the servo amplifier 310 terminates the current servo loop processing being executed and waits for an initialization command from the PC built-in numerical control system for the next power on of the PC built-in numerical control system.

Next, the PC termination timeout retry check means 55 receives a processing completion notification of the servo amplifier initialization means 52 and initializes a timer (step S76). The initialization procedure of the timer is the same as that previously described at step S9 in the first embodiment.

Next, the PC start completion check means 54 checks a PC application program start completion flag set in the dual port RAM 18 (step S77). The procedure of checking the PC application program start completion flag is the same as that previously described at step S10 in the first embodiment.

If a power on time start PC application program check table in the memory 11 does not match a start completion PC application program check table in the dual port RAM 18 (NO at step S77), it is judged that some application program in the PC section 200 is being started, and a timeout check notification is sent to the PC termination timeout retry check means 55.

Thus, the PC termination timeout retry check means 55 receives the notification from the PC start completion check means 54 and checks a timeout table (step S78).

As a result of the checking, if a timeout check valid flag is on and the timeout table is greater than 0, namely, if the timeout is not reached (NO at step S78), the PC termination timeout retry check means 55 sends a notification to the PC start completion check means 54 for instructing the PC start completion check means 54 to again execute step S77. If the timeout check valid flag is on and the timeout table becomes equal to or less than 0 (YES at step S78), the PC termination timeout retry check means 55 judges that timeout occurs, and goes to step S91 for displaying an alarm message.

If the power on time start PC application program check table in the memory 11 matches the start completion PC application program check table in the dual port RAM 18 (YES at step S77), the PC start completion check means 54 judges that starting of all application programs in the PC section 200 that must be started when the power is turned on is complete, and sends an application program start completion notification to the PC termination timeout retry check means 55.

Thus, the PC termination timeout retry check means 55 turns off the timeout check valid flag and resets the timer (step S79), then sets a value in a retry counter (step S80).

Next, based on notifications from the PC termination timeout retry check means 55 and the power off request signal detection means 33, the ladder circuit correspondence PC, termination acknowledgment means 32 issues a PC termination request to the PC section 200 (step S81).

Also in the second embodiment, the PC section 200 has an interrupt circuit (not shown) equivalent to an interrupt generation circuit in the NC section 100, and the PC termination request is issued to the interrupt circuit.

The ladder circuit correspondence PC termination acknowledgment means 32 in the NC section 100 checks a PC termination request response flag in the dual port RAM 18. If the PC termination request response flag is off (NO at step S82), the ladder circuit correspondence PC termination acknowledgment means 32 sends a retry check notification to the PC termination timeout retry check means 55.

Thus, the PC termination timeout retry check means 55 checks the retry counter. If the retry counter is greater than 0 (NO at step S83), the PC termination timeout retry check means 55 instructs the ladder circuit correspondence PC termination acknowledgment means 32 to again execute step S81, and decrements the retry counter.

In contrast, if the retry counter becomes 0 (YES at step S83), the PC termination timeout retry check means 55 judges retry over and instructs the ladder circuit correspondence PC termination acknowledgment means 32 to go to step S87.

If the PC termination request response flag is turned on (YES at step S82), the PC termination timeout retry check means 55 initializes the timer (step S84).

After this, the ladder circuit correspondence PC termination acknowledgment means 32 checks a PC termination completion flag in the dual port RAM 18. If the PC termination completion flag is turned on (YES at step S85), control goes to step S87.

In contrast, if the PC termination completion flag is off (NO at step S85), the ladder circuit correspondence PC termination acknowledgment means 32 issues a timeout check request to the PC termination timeout retry check means 55, and timeout is monitored in the same manner as at step S78 (step S86).

If the timeout is not reached (NO at step S86), the ladder circuit correspondence PC termination acknowledgment means 32 is instructed to again execute step S85. In contrast, if the timeout is reached (YES at step S86), control goes to step S87.

At step S87, the ladder circuit correspondence PC termination acknowledgment means 32 sends a PC termination completion notification to the power off enable signal output means 34. Upon reception of the notification from the ladder circuit correspondence PC termination acknowledgment means 32, the power off enable signal output means 34 turns on a power off enable signal. Specifically, in the ladder circuit diagram of FIG. 9, the device "Y310" defining the power off enable signal is turned on.

Here, the ladder circuit correspondence PC termination acknowledgment means 32 and the PC start completion check means 54 may repeat checking. However, since the means 32 and 53 exist in the machine control signal processing section 30 executed periodically, in execution of processing, the checking does not make a loop in the means and the machine control signal processing section 30 is designed so that it is always executed periodically.

Next, the ladder circuit section 14 checks the power off enable signal. If the power off enable signal goes on, the ladder circuit section 14 outputs a signal to the DS assigned to power off of the power unit 5 (step S88).

As the DS assigned to power off of the power unit 5 is turned on, the power unit 5 shuts down (turns off) the input power supply and feeds a power reset signal into the PC section 200 (step S89). The power reset operation for an HD controller and the state of a disk cache are the same as the contents previously described at step S21 in the first embodiment.

As described above, in the second embodiment, the ladder circuit section 14 can check that the application program and the operating system in the PC section 200 are terminated. Thus, the ladder circuit section 14 determines the power off conditions, so that the power unit 5 or a main circuit breaker of the PC built-in numerical control system can be turned off and further it is also made possible to automatically turn off the power.

At the instant at which the power is turned off, the application program or the operating system in the PC section 200 is prevented from reading or writing data from or onto the hard disk storage unit 250; the hard disk storage unit 250 is prevented from being destroyed or a file registered on the hard disk storage unit 250 is prevented from being destroyed.

Since a digital IO signal circuit of power off is contained in the power unit, the power of the power unit can be turned off using the same signal line for normal power off and power off based on an instruction of the ladder circuit section, wiring being saved.

The data backup means 56 in the NC section 100 and the backup data HD write means 217 and the PC power down handling start wait means 221 in the PC section 200 previously described in the first embodiment are not covered in the description of the second embodiment, but the data backup means 56 in the NC section 100 and the backup data HD write means 217 and the PC power down handling start wait means 221 in the PC section 200 may also be provided in the second embodiment, needless to say.

As seen from the description made so far, according to the PC built-in numerical control system according to the invention, when the power is turned off, the application program and the operating system in the PC section are terminated before the power is actually turned off. Thus, this prevents the application program or the operating system in the PC section from reading or writing data from or onto an external storage unit such as a hard disk storage unit at the instant at which the power is turned off; the external storage unit is prevented from being destroyed or a file registered on the external storage unit is prevented from being destroyed. Since the power off handling in the NC section is executed as one closed process independent of each process in the NC section, the power can be reliably turned off without being affected by the execution state of each process in the NC section.

According to the personal computer built-in numerical control system, since personal computer processing is terminated automatically, the operator is prevented from forgetting to terminate the application program and the OS in the PC section when turning off the power. Since a wait is made for the power supply voltage holding time or longer still after the power of the power unit is turned off at the top of the PC power down handling section (interrupt service) in the PC section, if the power unit turns off power because of a power outage, etc. the following can be prevented. Abruptly the current application program or the operating system in the PC section is forcibly terminated and the power is turned off while the external storage unit is frequently accessed, destroying the external storage unit. That is, if the power unit turns off power because of a power outage, etc. the PC section is interrupted and the application program, etc. in the PC section stops execution (in turn, the operation of frequently accessing the external storage unit is stopped). Since the PC power down handling start wait means maintains the stop state, the following can be prevented: The hold voltage of the power unit runs out in the stop period time and the operation of the PC section is terminated, destroying the external storage unit. Since a wait is made for the power supply voltage holding time or longer still after the power of the power unit is turned off at the top of the PC power down handling section for preventing the system from advancing to the next process, both the circuit and handling (processing) can be made common to power off with the power off switch and power off because of a power outage, etc., simplifying the configuration.

Since a wait is made for the power supply voltage holding time or longer still after the power of the power unit is turned off at the top of the PC power down handling section (interrupt service) in the PC section for preventing the system from advancing to the next process, if the power unit turns off power because of a power outage, etc., the following can be prevented: Abruptly the current application program or the operating system in the PC section is forcibly terminated and the power is turned off while the external storage unit is frequently accessed, destroying the external storage unit. That is, it the power unit turns off power because of a power outage, etc., the PC section is interrupted and the application program, etc., in the PC section stops execution (in turn, the operation of frequently accessing the external storage unit is stopped). Since the PC power down handling start wait means maintains the stop state, the following can be prevented: The hold voltage of the power unit runs out in the stop period time and the operation for the PC section is terminated, destroying the external storage unit. Since a wait is made for the power supply voltage holding time or longer still after the power of the power unit is turned off at the top of the PC power down handling section for preventing the system from advancing to the next process, both the circuit and handling (processing) can be made common to power off with the power off switch and power off because of a power outage, etc. simplifying the configuration.

According to the following personal computer built-in numerical control system according to the invention, when power off handling is started, the state of a digital output signal output by a machine control signal processing section is set by digital signal output selection means to a specified state and the machine state when the power is turned off can be set to a predetermined state. Thus, for example, if the servo lock state of a servo motor is released by turning off the power of the servo motor for controlling a head or a work table moving up and down, a digital signal for an electromagnetic brake of the servo motor is turned on for actuating the electromagnetic brake, whereby the head or the work table can be prevented from dropping.

According to the following personal computer built-in numerical control system according to the invention, a ladder circuit can check that an application program and an operating system in a PC section are terminated. Thus, a power unit or a main circuit breaker can be turned off based on power off condition determination of the ladder circuit, and the application program or the operating system in the PC section is prevented from reading or writing data from or onto an external storage unit such as a hard disk storage unit at the instant at which the power is turned off; the external storage unit is prevented from being destroyed or a file registered on the external storage unit is prevented from being destroyed. For a machine tool having a function whereby if working of a predetermined number of workpieces is complete, a ladder circuit section judges it and turns off the power of the tool machine (automatic power off function), the automatic power off function can be provided without inviting destruction of an external storage unit.

According to the following personal computer built-in numerical control system according to the invention, as a power off switch is pressed, a ladder circuit section determines the state of any other signal input from a machine tool. If the power off conditions are not satisfied, staring of power off handling is inhibited and alarm output processing is performed. If the power off conditions are satisfied, a power off request signal of the ladder circuit section is turned on and power off handling is started. Thus, if there is a harm in turning off the power of the machine tool, the power can be prevented from being turned off and a failure can be prevented from occurring in the machine tool.

According to the following personal computer built-in numerical control system according to the invention, when starting of an application program is complete, application program start completion notification means in a PC section sends a start completion notification to an NC section, and PC start completion check means in the NC section checks the application program start completion notification from the PC section. If start completion is indicated, the PC start completion check means sends a notification indicating termination processing continuation to termination acknowledgement means. Thus, a wait is made for power off handling until completion of starting the application program in the PC section. Although an external storage unit such as a hard disk storage unit is frequently accessed (data read or write) while the application program in the PC section is being started (during initialization), the application program in the PC section is prevented from reading or writing data from or onto an external storage unit at the instant at which the power is turned off; the external storage unit is prevented from being destroyed or a file registered-on the external storage unit is prevented from being destroyed, and the power can be turned off reliably.

According to the following personal computer built-in numerical control system according to the invention, if PC termination retry timeout check means in an NC section cannot acknowledge a response of a PC section to a request issued to the PC section or if an application program start completion notification cannot be acknowledged, retry over or timeout checking is performed, thus the processing termination of the personal computer section can be acknowledged more reliably. After termination request sent from the PC termination acknowledgement means in the numerical control system section is sensed, a disk cache of an external storage unit in the personal computer section is invalidated and a power unit outputs a power reset signal for inhibiting a controller of the external storage unit in the personal computer section from newly writing data, thus the controller of the external storage unit in the personal computer section does not newly write data and at this time, the disk cache of the controller of the external storage unit is invalidated. A termination notification is sent to PC termination acknowledgement means. If an application program, etc., starts writing onto an external storage unit at the same time as power off is started, a power unit holds the power supply voltage for as long as the time to completion of the writing. Thus, if an abnormal condition occurs in the PC section and writing onto an external storage unit such as a hard disk storage unit occurs at the same time as the power is turned off, the power supply voltage is held for as long as the time to completion of the writing; if an abnormal condition occurs in the PC section, the external storage unit is not destroyed and the power can always be turned off reliably. If the power is abruptly turned off because of a power outage, if an application program or an operating system in the PC section starts writing onto an external storage unit at the same time as the power is turned off, the power unit holds the power supply voltage for as long as the time to completion of the writing, so that the external storage unit is not destroyed. If an expensive unit such as a UPS (uninterruptible power supply) is not provided, the external storage unit can be prevented from being destroyed.

According to the following personal computer built-in numerical control system according to the invention, as power off handling is started, servo amplifier initialization means transmits an emergency stop signal and a termination command to a servo amplifier, thus the corresponding servo motor is stopped and the servo amplifier waits for an initialization command for the next power on of the numerical control system.

According to the following personal computer built-in numerical control system according to the invention, parameters, etc., for controlling servo motors, etc., are backed up on an external storage unit, so that nonvolatile memory such as flash memory used for data backup by a conventional numerical control system need not be provided.

Although the flash memory in the conventional numerical control system is limited in data size and is hard to back up all data, the backed-up parameters and data size are not limited because the data is backed up on the external storage unit.

INDUSTRIAL APPLICABILITY

As described above, the invention is appropriate for use with a personal computer built-in numerical control system.

What is claimed is:

1. A numerical control system having a numerical control (NC) system section and a personal computer (PC) section, said numerical control system comprising:

an interrupt generation circuit provided in the numerical control system section for generating an interrupt in the NC system section when a power off switch is pressed;

PC termination acknowledgement means provided in the numerical control system section for sending a termination request to the personal computer section when the interrupt is generated by said interrupt generation circuit, acknowledging a PC termination notification from the personal computer section, and requesting a signal output circuit to turn on a signal previously assigned to power off a power unit;

a PC power down handling section provided in the personal computer section for forcibly terminating an application program and an operating system in the personal computer section after receiving the termination request sent from said PC termination acknowledgement means in the numerical control system section;

PC power down handling start wait means provided in the personal computer section for waiting for at least a power supply voltage holding time after the power of the power unit is turned off at the beginning of PC power down handling for preventing said operating system from advancing to the next process, and a BIOS section provided in the personal computer section for checking that the operating system is terminated and sending the PC termination notification to the numerical control system section, wherein the power unit turns off power as the signal assigned to power off is turned on by the signal output circuit.

2. The numerical control system as claimed in claim 1, further comprising digital signal output selection means provided in the numerical control system section for setting a state of a digital output signal output by a machine control signal processing section in the numerical control system section, to a specified state when power off handling is started.

3. A numerical control system having a numerical control system section and a personal computer section, said numerical control system comprising:

power off request signal detection means provided in the numerical control system section for detecting a power off request signal from a ladder circuit section;

ladder circuit correspondence PC termination acknowledgement means provided in the numerical control system section for sending a termination request to the personal computer section when the power off request signal is detected by said power off request signal detection means and acknowledging a termination notification from the personal computer section;

power off enable signal output means provided in the numerical control system section for turning on a power off enable signal of the ladder circuit section when said ladder circuit correspondence PC termination acknowledgement means acknowledges the PC termination notification from the personal computer section;

a PC power down handling section provided in the personal computer section for forcibly terminating an application program and an operating system in the personal computer section after receiving the termination request sent from said ladder circuit correspondence PC termination acknowledgement means in the numerical control system section; and PC power down handling start wait means provided in the personal computer section for waiting for at least a power supply voltage holding time after the power of the power unit is turned off at the beginning of PC power down handling, for preventing said operating system from advancing to the next process;

a BIOS section provided in the personal computer section for checking that the operating system is terminated and sending a PC termination notification to the numerical control system section, wherein the power unit turns off power when a signal assigned to power off, in the ladder circuit section, is turned on by a signal output circuit, and the power off enable signal of the ladder circuit section is turned on by said power off enable signal output means.

4. The numerical control system as claimed in claim 3, wherein when a power off switch is pressed, the ladder circuit section determines a state of any other signal input from a machine tool, wherein if power off conditions are not satisfied, starting of power off handling is inhibited and alarm output processing is performed, and wherein if power off conditions are satisfied, a power off request signal of the ladder circuit section is turned on.

5. The numerical control system as claimed in any one of claims 1 to 4, further comprising:

application program start completion notification means provided in the personal computer section for sending an application program start completion notification; and PC start completion check means provided in the numerical control system section for checking the application program start completion notification received from said application program start completion notification means, and if start completion is indicated, said PC start completion check means sends a termination processing continuation notification to said PC termination acknowledgement means or said ladder circuit correspondence PC termination acknowledgement means.

6. The numerical control system as claimed in any one of claims 1 to 4, further comprising:

PC termination timeout retry check means provided in the numerical control system section for initiating a retry or a timeout check, at least if PC termination notification from the personal computer section cannot be acknowledged or if an application program start completion notification cannot be acknowledged, and sending a termination notification to said PC termination acknowledgement means or said ladder circuit correspondence PC termination acknowledgement means; and disk cache control means provided in the personal computer section for invalidating a disk cache of an external storage unit in the personal computer section after receiving a termination request sent from said PC termination acknowledgement means or said ladder circuit correspondence PC termination acknowledgement means in the numerical control system section, wherein the power unit outputs a power reset signal for inhibiting a controller of the external storage unit in the personal computer section from newly writing data when the power is turned off, and has a power supply voltage holding function for holding power supply voltage for as long as a time for completion of writing if an application program starts writing onto the external storage unit at the same time as the power of the power unit is turned off.

7. The numerical control system as claimed in any one of claims 1 to 4, further comprising servo amplifier initialization means provided in the numerical control system section for transmitting an emergency stop signal and a termination command to a servo amplifier when power off handling is started.

8. The numerical control system as claimed in any one of claims 1 to 4, further comprising data backup means provided in the numerical control system section for reading a parameter registered in the numerical control system section or data edited by a user, and transferring said parameter or data to the personal computer section as power off handling is performed, and backup data write means provided in the personal computer section for writing the backup data from said data backup means into a determined location of a hard disk unit.

9. The numerical control system as claimed in claim 5, further comprising:

PC termination timeout retry check means provided in the numerical control system section for initiating a retry or a timeout check, at least if PC termination notification from the personal computer section cannot be acknowledged or if an application program start completion notification cannot be acknowledged, and sending a termination notification to said PC termination acknowledgement means or said ladder circuit correspondence PC termination acknowledgement means: and disk cache control means provided in the personal computer section for invalidating a disk cache of an external storage unit in the personal computer section after receiving a termination request sent from said PC termination acknowledgement means or said ladder circuit correspondence PC termination acknowledgement means in the numerical control system section, wherein the power unit outputs a power reset signal for inhibiting a controller of the external storage unit in the personal computer section from newly writing data when the power is turned off, and has a power supply voltage holding function for holding power supply voltage for as long as a time for completion of writing if an application program starts writing onto the external storage unit at the same time as the power of the power unit is turned off.

10. The numerical control system as claimed in claim 5, further comprising servo amplifier initialization means provided in the numerical control system section for transmitting an emergency stop signal and a termination command to a servo amplifier when power off handling is started.

11. The numerical control system as claimed in claim 5, further comprising data backup means provided in the numerical control system section for reading a parameter registered in the numerical control system section or data edited by a user, and transferring said parameter or data to the personal computer section as power off handling is performed, and backup data write means provided in the personal computer section for writing the backup data from said data backup means into a determined location of a hard disk unit.

12. The numerical control system as claimed in claim 6, further comprising servo amplifier initialization means provided in the numerical control system section for transmitting an emergency stop signal and a termination command to a servo amplifier when power off handling is started.

13. The numerical control system as claimed in claim 6, further comprising data backup means provided in the numerical control system section for reading a parameter registered in the numerical control system section or data edited by a user, and transferring said parameter or data to the personal computer section as power off handling is performed, and backup data write means provided in the personal computer section for writing the backup data from said data backup means into a determined location of a hard disk unit.

14. The numerical control system as claimed in claim 7, further comprising data backup means provided in the numerical control system section for reading a parameter registered in the numerical control system section or data edited by a user, and transferring said parameter or data to the personal computer section as power off handling is performed, and backup data write means provided in the personal computer section for writing the backup data from said data backup means into a determined location of a hard disk unit.

* * * * *